(12) United States Patent
Heng et al.

(10) Patent No.: US 11,620,553 B2
(45) Date of Patent: Apr. 4, 2023

(54) SYSTEM AND METHOD FOR FORECASTING LEAKS IN A FLUID-DELIVERY PIPELINE NETWORK

(71) Applicant: Utopus Insights, Inc., Valhalla, NY (US)

(72) Inventors: Fook-Luen Heng, Yorktown Heights, NY (US); Jefferson Huang, Stony Brook, NY (US); Tarun Kumar, Mohegan Lake, NY (US); Rui Zhang, Ossining, NY (US)

(73) Assignee: Utopus Insights, Inc., Valhalla, NY (US)

( * ) Notice: Subject to any disclaimer, the term of this patent is extended or adjusted under 35 U.S.C. 154(b) by 700 days.

(21) Appl. No.: 15/134,868

(22) Filed: Apr. 21, 2016

(65) Prior Publication Data
US 2017/0308796 A1 Oct. 26, 2017

(51) Int. Cl.
*G06N 20/00* (2019.01)
*F17D 5/00* (2006.01)
(Continued)

(52) U.S. Cl.
CPC ............. *G06N 5/048* (2013.01); *E03B 7/071* (2013.01); *F17D 5/00* (2013.01); *F17D 5/02* (2013.01); *G01M 3/00* (2013.01); *G06N 20/00* (2019.01)

(58) Field of Classification Search
CPC .. G06N 5/00; G06N 5/04; G06N 7/00; G06N 7/005; G06N 99/00; G06N 99/005;
(Continued)

(56) References Cited

U.S. PATENT DOCUMENTS 4,727,748 A 3/1988 Horigome et al.
5,416,724 A 5/1995 Savic
(Continued)

FOREIGN PATENT DOCUMENTS

WO 9714945 A2 4/1997

OTHER PUBLICATIONS

Reddy et al., "Leak Detection in a Ga Pipeline Networks Using an Efficient State Estimator. Part-I: Theory and Simulations", Computer and Chemical Engineering, 35, 2011, pp. 651-661.
(Continued)

*Primary Examiner* — Markus A. Vasquez
(74) *Attorney, Agent, or Firm* — Ahmann Kloke LLP

(57) ABSTRACT

A system for forecasting leaks in a fluid-delivery pipeline network. The system identifies a subsystem in the pipeline network that comprises a plurality of topologically connected stations. The system accesses historical temporal sensor measurements of a plurality of variables of the stations that are directly connected and generates a temporal causal dependency model for a first control variable at the first station in the subsystem, based on the plurality of time series of sensor measurements of a second variable of the first station, and temporal delay characteristics of the plurality of time series of sensor measurements of the second variable at the stations directly connected to the first station. The system automatically calculates a normal operating value of the first control variable at the first station and the deviations between actual measured values and the normal operating value and determines a threshold deviation that indicates a leak event.

20 Claims, 3 Drawing Sheets

(51) Int. Cl.
  *G01M 3/00* (2006.01)
  *E03B 7/07* (2006.01)
  *F17D 5/02* (2006.01)
  *G06N 5/04* (2006.01)
  *G06N 5/048* (2023.01)

(58) Field of Classification Search
  CPC .......... G06N 20/00; G06Q 10/04; G01F 1/50; G01F 23/00; G01M 3/00; G01M 3/04; G01M 3/08; G01M 3/26; G01M 3/28; G01M 3/2807; G01M 3/2892; G05B 13/04; G05B 13/048; G01N 11/00; G01N 11/02; G05D 7/00; G05D 7/06; G05D 7/0617; G05D 7/0629; F17D 5/02; F17D 5/00; E03B 7/071
  See application file for complete search history.

(56) References Cited

U.S. PATENT DOCUMENTS

| | | | | |
|---|---|---|---|---|
| 5,866,802 | A * | 2/1999 | Kimata | G01M 3/2815 431/12 |
| 6,171,025 | B1 | 1/2001 | Langner et al. | |
| 6,668,619 | B2 | 12/2003 | Yang et al. | |
| 6,725,705 | B1 | 4/2004 | Huebler et al. | |
| 2005/0011252 | A1* | 1/2005 | Arima | G01M 3/2815 73/40.5 R |
| 2005/0246112 | A1* | 11/2005 | Abhulimen | F17D 5/02 702/51 |
| 2014/0255216 | A1* | 9/2014 | Kallesoe | F04D 15/0066 417/212 |
| 2015/0308919 | A1* | 10/2015 | Zhang | G01M 3/243 702/51 |
| 2016/0191163 | A1* | 6/2016 | Preston | G01B 11/161 398/16 |
| 2016/0356666 | A1* | 12/2016 | Bilal | G01M 3/2807 |
| 2017/0076563 | A1* | 3/2017 | Guerriero | G06F 17/30424 |
| 2017/0090068 | A1* | 3/2017 | Xiang | G01W 1/10 |
| 2017/0098240 | A1* | 4/2017 | Yang | G06Q 30/0254 |
| 2017/0235626 | A1* | 8/2017 | Zhang | G06F 11/0709 714/26 |
| 2017/0249554 | A1* | 8/2017 | Zirnstein | G05B 23/0283 |

OTHER PUBLICATIONS

List of IBM Patents or Patent Applications Treated as Related, pp. 1-2, dated Apr. 15, 2016.

Isa D., Rajkumar R., "Pipeline defect prediction using support vector machines", Applied Artificial Intelligence, 23, 2009 pp. 758-771, Taylor & Francis Group LLC.

Ma C., "Negative Pressure Wave-Flow Testing Gas Pipeline Leak Based on Wavelet Transform", Proceedings of International Conference on Computer, Mechatronics, Control and Electronic Engineering; Changchun, China. Aug. 24-26, 2010; pp. 306-308.

Martins J.C., Seleghim P., Jr., "Assessment of the Performance of Acoustic and Mass Balance Methods for Leak Detection in Pipelines for Transporting Liquids", ASME Journal of Fluids Engineering, Jan. 2010, vol. 132, pp. 1-8.

Md Akib A., Saad N., Asirvadam V., "Pressure Point Analysis for Early Detection System", Proceedings of IEEE 7th International Colloquium on Signal Processing and Its Applications, 2001, pp. 103-107.

Kim M.-S., Lee S.-K., "Detection of leak acoustic signal in buried gas pipe based on the time-frequency analysis", Journal of Loss Prevention in the Process Industries 22, 2009, pp. 990-994.

Lay-Ekuakille A., Vendramin G., Trotta A., "Spectral analysis of leak detection in a zigzag pipeline: A filter diagnalization method-based algorithm application", Measurement 42, 2009, pp. 358-367.

Bai L., Yue Q.-J., Li H.-S. "Pipeline fluid monitoring and leak location based on hydraulic transient and extended Kalman filter, Chinese Journal of Computational Mechanics", vol. 22, No. 6, Dec. 2005, pp. 739-744 with English abstract.

Wan J , Yu Y , Wu Y , Feng R , Yu N. Hierarchical leak detection and localization method in natural .gas pipeline monitoring sensor networks. Sensors (Basel). 2012;12(1):189-214. doi: 10.3390/s120100189. Epub Dec. 27, 2011. PMID: 22368464; PMCID: PMC3279208.

* cited by examiner

SYSTEM AND METHOD FOR FORECASTING LEAKS IN A FLUID-DELIVERY PIPELINE NETWORK

BACKGROUND

The present application relates to forecasting leaks in a physical delivery system, and more specifically, to forecast leaks with the consideration of interactions between different variables.

A physical delivery system includes a pipeline system that delivers fluids, such as liquid and/or gas. For example, a gas pipeline system to deliver gas, which is used as fuel for heating, cooling, or any other purposes, is a physical delivery system. Forecasting leaks in gas pipeline system caused by rupture or small damage to the gas pipe line infrastructure is essential for gas pipeline management, and essential for safety of both human beings and the environment. In the physical delivery system, usually a sensor network exists, measuring and recording in real time multiple physical properties of the gas being delivered, hence monitoring the health or risk of the system. In one example, such information is being captured by the so called SCADA (supervisory control and data acquisition) system.

The gas pipe line system is a complex system with unsteady compressible flow and frequent compressor operations. Due to the nature of compressibility of the gas dynamics, there is a lagged effect for any change at one location to take effect on connected locations at different speed under different operation conditions. Additionally, not all physical properties, including pressure and flow measurements, are available at all the stations.

SUMMARY OF THE INVENTION

One embodiment of this disclosure is directed to a method for forecasting leaks in a fluid-delivery pipeline network. The method includes identifying a subsystem in the pipeline network, which comprises a plurality of stations that are topologically connected. The method then includes accessing historical temporal sensor measurements of a plurality of variables from the stations in the subsystem that are directly connected.

Next, the method includes generating a temporal causal dependency model for a first control variable at the first station in the subsystem, based on the plurality of time series of sensor measurements of a second variable of the first station, and temporal delay characteristics of the plurality of time series of sensor measurements of the second variable at the stations directly connected to the first station. The method further includes automatically calculating a normal operating value of the first control variable at the first station by applying a learning algorithm to train the temporal causal dependency model over a first training period comprising one or more time series of sensor measurements made under normal operating conditions.

Then, the method includes calculating deviations between actual measured values of the first control variable at the first station and the normal operating value of the first control variable at the first station over the first training period. Further, the method includes determining a threshold deviation of the first control variable that indicates a leak event by calculating the deviations of the first control variable for a second training period comprising a plurality of time series of sensor measurements made under both normal operating conditions and leak event operating conditions.

In one embodiment, the plurality of time series of sensor measurements of a second variable of the plurality of variables at the first station are current values of the sensor measurements. In another embodiment, the temporal delay characteristics of the plurality of time series of sensor measurements of the second variable at the stations directly connected to the first station are lagged values of the sensor measurements.

In an embodiment, the system further applies the learning algorithm to the temporal causal dependency model to compute a risk score of the first control variable. The risk score is based on differences between the calculated deviations and the threshold deviation.

In one embodiment, the learning algorithm is a Lasso model. In another embodiment, the system further applies the learning algorithm for ranking the time series of sensor measurements of the plurality of variables for generating the temporal causal dependency model for the first control variable.

One embodiment of the disclosure is directed to a computer system for forecasting leaks in a fluid-delivery pipeline network. The computer system includes one or more non-transitory computer readable storage media and program instructions, stored on the one or more non-transitory computer-readable storage media, which when implemented by a user interface accessing a service provider website, cause the computer system to perform the steps of identifying a subsystem in the pipeline network, which comprises a plurality of stations that are topologically connected. The method then includes accessing historical temporal sensor measurements of a plurality of variables from the stations in the subsystem that are directly connected Next, the method includes generating a temporal causal dependency model for a first control variable at the first station in the subsystem, based on the plurality of time series of sensor measurements of a second variable of the first station, and temporal delay characteristics of the plurality of time series of sensor measurements of the second variable at the stations directly connected to the first station. The method further includes automatically calculating a normal operating value of the first control variable at the first station by applying a learning algorithm to train the temporal causal dependency model over a first training period comprising one or more time series of sensor measurements made under normal operating conditions. Then, the method includes calculating deviations between actual measured values of the first control variable at the first station and the normal operating value of the first control variable at the first station over the first training period. Further, the method includes determining a threshold deviation of the first control variable that indicates a leak event by calculating the deviations of the first control variable for a second training period comprising a plurality of time series of sensor measurements made under both normal operating conditions and leak event operating conditions.

One embodiment of the disclosure is directed to a non-transitory article of manufacture tangibly embodying computer readable instructions, which when implemented, cause a computer to perform the steps of identifying a subsystem in the pipeline network, which comprises a plurality of stations that are topologically connected. The method then includes accessing historical temporal sensor measurements of a plurality of variables from the stations in the subsystem that are directly connected Next, the method includes generating a temporal causal dependency model for a first control variable at the first station in the subsystem, based on the plurality of time series of sensor measurements of a second variable of the first station, and temporal delay characteristics of the plurality of time series of sensor measurements of the second variable at the stations directly connected to the first station. The method further includes automatically calculating a normal operating value of the first control variable at the first station by applying a learning algorithm to train the temporal causal dependency model over a first training period comprising one or more time series of sensor measurements made under normal operating conditions. Then, the method includes calculating deviations between actual measured values of the first control variable at the first station and the normal operating value of the first control variable at the first station over the first training period. Further, the method includes determining a threshold deviation of the first control variable that indicates a leak event by calculating the deviations of the first control variable for a second training period comprising a plurality of time series of sensor measurements made under both normal operating conditions and leak event operating conditions.

BRIEF DESCRIPTION OF THE DRAWINGS

These and other objects, features and advantages of the present invention will become apparent from the following detailed description, which is to be read in connection with the accompanying drawings, in which.

DETAILED DESCRIPTION

This invention is a system and method for forecasting leaks in a fluid-delivery pipeline network. A physical delivery system includes multiple stations directly connected by a pipeline network to deliver fluids including liquid and/or gas.

In one embodiment, the technical solutions determine topological connectivity and relative distance from temporal sensor measurements of a gas transmission system; estimate temporal delays between connected delivery points in the high-pressure gas transmission system; and forecast leaks in the gas transmission system. The leaks may be caused, for example, by a rupture of the gas pipeline infrastructure. In another example, the leaks may be caused by small damage to the pipeline network, which over an extended period of time, such as days, weeks, months, or any other period of time, leads to a rupture event. The technical solutions forecast the leaks based on identification of patterns in the temporal sensor measurements captured at the stations in the gas transmission system. The system generates a model to forecast leaks with the consideration of interactions between different variables, which means that the generated model is for a control variable different from the variables with temporal sensor measurements that are captured at the stations. Accordingly, the technical solutions facilitate a real-time leak detection, to prevent rupture leak events in the future.

Figure 1:
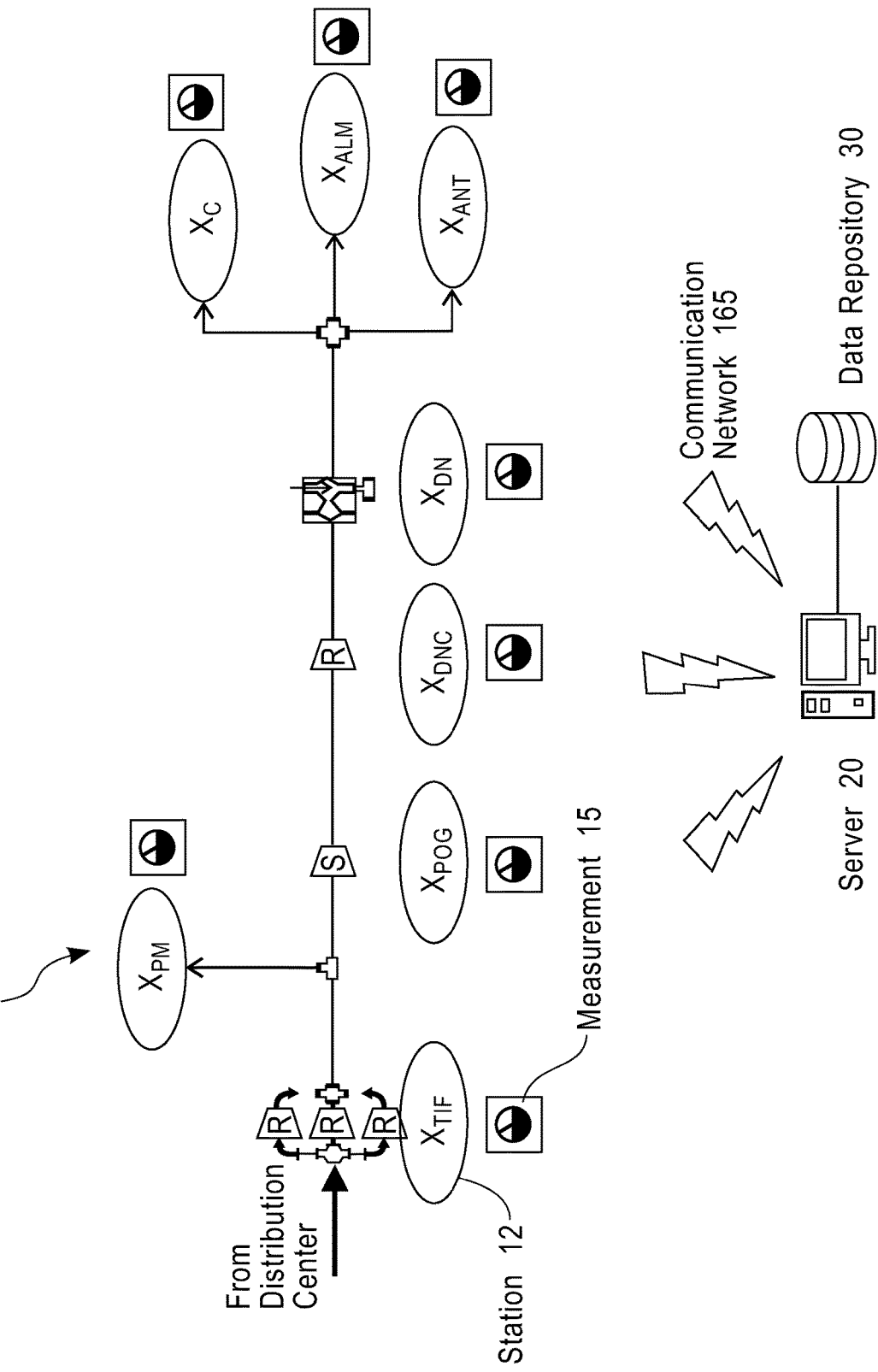
FIG. 1 is a block diagram of one embodiment of the fluid-delivery pipeline network.

FIG. 1 depicts one embodiment of a fluid-delivery pipeline network 10. The pipeline network 10 comprises multiple stations 12, each station 12 connected with at least one other station 12 via a pipeline that carries fluid between the stations. In an example, as illustrated, sensors at each station 12 acquire measurements 15. The measurements 15 may be transmitted for reception by a server 20 over a communication network 165. The server 20 may store the measurements 15 from each station 12 in a data repository 30.

The station 12 in the pipeline network 10 may be a supply station, a destination station, or a combination thereof. For example, a supply station (such as $X_{TIF}$) forwards fluid received to one or more other stations in the pipeline network 10. A destination station (such as $X_{ALM}$) receives the fluid via the pipelines for using the fluid, without forwarding any fluid to other stations. A combination station may receive the fluid, out of which a part may be used at the station and the rest forwarded to other stations.

The station 12 may include a compressor, a fork, or any other equipment to direct the flow of the fluid via the pipeline network 10. In addition, the station 12 may be equipped with sensors to acquire the measurements 15, such as a volume, a flow-rate, a pressure, or any other attribute of the fluid received at the station 12 and/or the fluid being transported from the station 12. The station 12 may further be equipped with transmitters to transmit the measurements 15. In another example, the sensors may be equipped for the transmission of the measurements 15.

The server 20 may receive the measurements 15 and store the measurements from each station 12 in the data repository 30. The server 20 may store a temporal series of sensor measurements from each station 12 that includes measurements 15 from each station over a predetermined time-span. For example, the temporal series of sensor measurement for station $X_{TIF}$ may include measurements 15 acquired at $X_{TIF}$ over the predetermined time-span, such as fifteen minutes, two hours, three days, two months, or any other time-span. The repository 30 that stores the temporal measurements from each station 12 may be a database, a data warehouse or any other computer readable storage accessible by the server 20. In an example, the data repository 30 may be part of the server 20. In another example, the data repository 30 may be at a remote location relative to the server 20. The server 20 and the data repository 30 communicate over the communication network 165. The communication network 165 may be a wired or a wireless communication network, or a combination of both. The communication network 165 may use a communication protocol such as transmission control protocol/internet protocol (TCP/IP), user datagram protocol (UDP), or any other protocol or a combination thereof.

Figure 2:
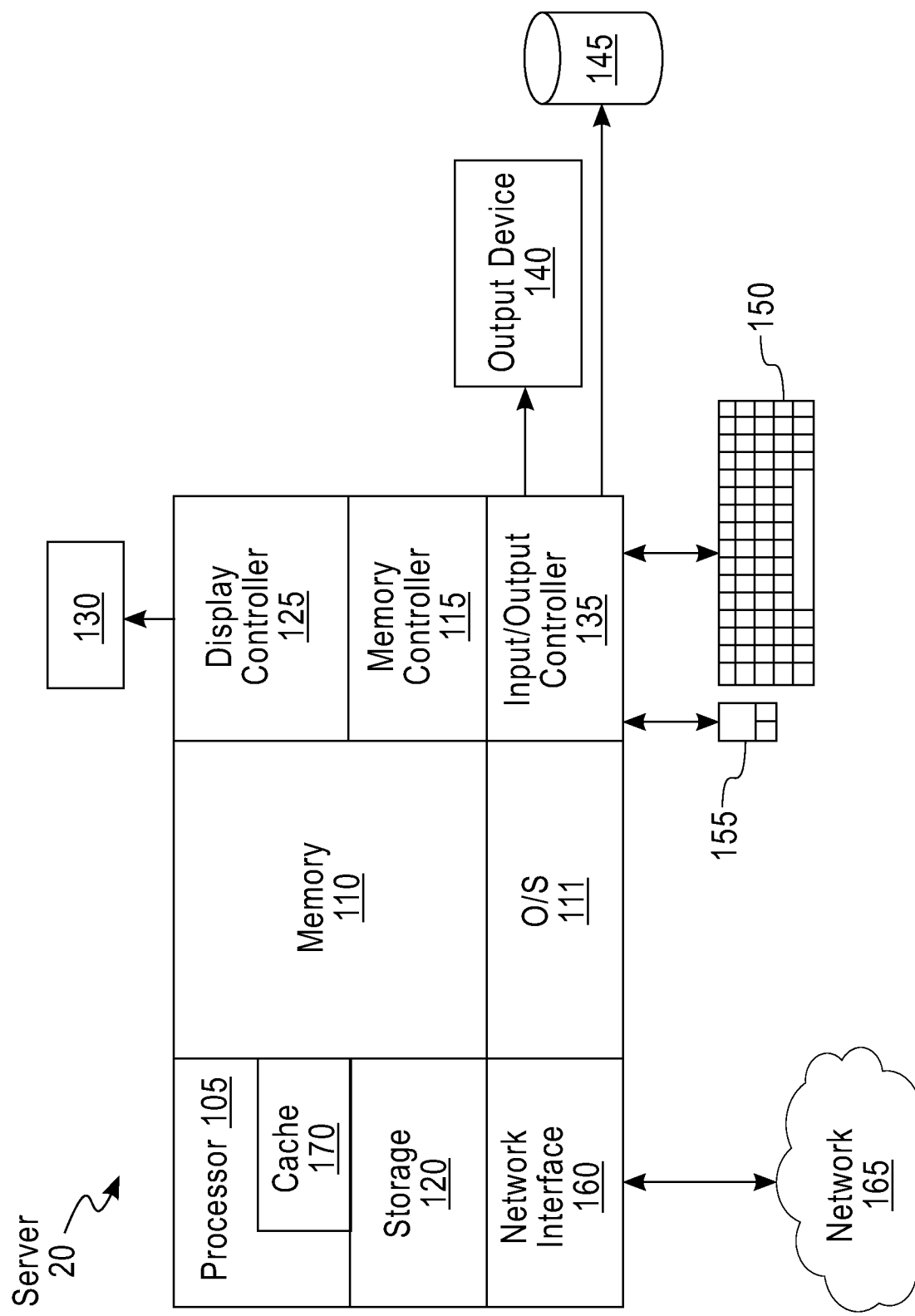
FIG. 2 is a block diagram of an exemplary computing system suitable for implementation of this invention.

FIG. 2 illustrates an example block diagram of the server 20. The server 20 may be a communication apparatus, such as a computer. For example, the server 20 may be a desktop computer, a tablet computer, a laptop computer, a phone, such as a smart phone, a server computer, or any other device that communicates via the network 165. The server 20 includes hardware, such as electronic circuitry.

For example, the server 20 includes, among other components, a processor 105, memory 110 coupled to a memory controller 115, and one or more input devices 145 and/or output devices 140, such as peripheral or control devices, which are communicatively coupled via a local I/O controller 135. These devices 140 and 145 may include, for example, battery sensors, position sensors (such as an altimeter, an accelerometer, a global positioning satellite receiver), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the server 20, a semiconductor based microprocessor (in the form of a microchip or chip set), a macro processor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The server 20 may further include a display controller 125 coupled to a user interface or display 130. In some embodiments, the display 130 may be an LCD screen. In other embodiments, the display 130 may include a plurality of LED status lights. In some embodiments, the server 20 may further include a network interface 160 for coupling to a network 165. The network 165 may be an IP-based network for communication between the server 20 and an external server, client and the like via a broadband connection. In an embodiment, the network 165 may be a satellite network. The network 165 transmits and receives data between the server 20 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The server 20 may be part of a supervisory control and data acquisition (SCADA) system. The technical solutions facilitate the SCADA system to obtain, in an automated manner, a physical/topological network of the pipeline network 10 by mapping of the measurements 15 between the stations of the pipeline network 10. The technical solutions determine the topological network based on the measured physical properties of the fluid being delivered, such as, pressure, flow rate, by identifying a time delayed effect from one station in the pipeline network 10 to a directly connected station in the pipeline network 10. Two directly connected stations are stations connected directly by pipelines, without any other stations in between. In an example, the delayed effects may be statistically evaluated to automate the process of mapping the measurements 15 to the topological network.

One embodiment of establishing the topological connectivity of a pipeline network is disclosed in U.S. patent application Ser. No. 14/976,820, filed on Dec. 21, 2015 and assigned to the same assignee as the present application.

To determine the topological connectivity of a pipeline network, the server receives or accesses the temporal sensor measurements of the stations of the fluid-delivery pipeline network. For example, the server receives the measurements from the sensors at the stations, or alternatively accesses the measurements from the data repository. The server cleans the data in the measurements in preparation of determining the topological network of the pipeline network. For example, the cleaning may include removal of outliers in each temporal series of respective stations. In addition or alternatively, the server may smooth each temporal series of sensor measurements. In addition or alternatively, the server may remove short spikes from each series of sensor measurements. In addition or alternatively, the server may perform other data cleaning operations on the temporal sensor measurements in other examples.

The server further analyzes the temporal sensor measurements to determine causality between temporal sensor measurements of the stations in the pipeline network. For example, the server analyzes the temporal sensor measurements of the stations in a pairwise manner, to identify if measurements observed at a first station affect the measurements at a second station. For example, if a compressor operation at an upstream station may have an effect at a downstream station. The effect at the downstream station may be observed after a time delay, for example due to the time taken by the fluid to flow to the downstream station.

For example, the server determines a causality model using the multiple series of measurement data from each of the stations. For example, the causality model may be determined based on multivariate regression, such as using Granger model, in which given P number of time series, $X_1$-$X_P$, the model may determine each time series $X_i$ that represents the causes. Table 1 illustrates an example causality model.

TABLE 1

$$X_i(t) = \sum_{j=1}^{p} \alpha_{i,j}^T X_j^{t,Lagged} + \epsilon$$

where:
$X_j^{t,Lagged} = [X_j(t - L), \ldots, X_j(t - 1)]$ is the lagged time series
$\alpha_{i,j}^T = [\alpha_{i,j,1}, \ldots, \alpha_{i,j,L}]$ is the coefficient vector,
If any of the $\alpha_{i,j,\{1, \ldots, L\}} \neq 0 \Rightarrow X_j \to X_i$
possible challenges: for high dimensional data, when L is large, we have p × L number of features in the regression, it is possible that the model picks up smalle causal effects. Therefore, it is important to have some penalization so that the causal relationship is most significant.

Thus, the server computes a plurality of temporal lags $X_i(t)$ and corresponding coefficients $\alpha_i$, such as using multivariate regression analysis using L1 penalty. The server identifies the temporal lag $X_k(t)$ that has the maximum corresponding coefficient $\alpha_k$. The identified temporal lag $X_k(t)$ is then used in subsequent computations and identification of the temporal connectivity of the pipeline network.

The server further identifies pairwise connectivity of the stations based on the causality, and generates a causality graph. For example, the server identifies a penalization model to filter the causality relationships identified. For example, the penalization model may be based on one of several techniques such as a Grouped-Lasso-Granger, a Lasso regression, or a Grouped-Lasso regression, among others. Table 2 illustrates models of example penalization models.

TABLE 2

Grouped-Lasso-Granger

Grouped-Lasso ($\ell_1$) penalty is used to obtain a sparse graph structure:

$$\min_{\{B\}} \sum_{t=L+1}^{T} \sum_{i=1}^{p} \left\| X_i(t) - \sum_{i=1}^{p} \beta_{i,j}^T X_j^{t,Lagged} \right\|_2^2 + \lambda \sum_{i=1}^{p} \|\beta_i\|_1$$

Lasso regression uses $\ell_1$ penalty, which tend to "push" coefficients to zero, therefore, arrives at a sparse structure, capturing the most important temporal dependency between time series. Grouped-Lasso regression penalize the sum of the coefficients of lagged series from one time series, therefore will arrive at a sparse structure in pair wise causal graph. In other words, we can reduce the number of non-zero coefficients on the causal effect from one time series to effect time series, thus reduce multiple temporal causality problem.

Based on the causality model and the penalization model, the server generates a causality graph of the temporal sensor measurements. The causality graph includes a set of nodes and a set of links. The nodes are representative of the stations of the pipeline network. A pair of nodes in the causality graph is connected by a link in response to the corresponding pair of stations being temporally dependent. The causality graph is non-cyclical.

The server determines a topological network of the pipeline network based on the causality graph. The server traverses the causality graph recursively to identify nodes with at least one-level subnetworks. A node with at least one-level subnetwork is a node that is connected to at least one other node that corresponds to a downstream station. The server further selects a node from the nodes with at least one-level subnetworks and identifies the first-level connections of that node. The first level connections are direct connections. Consider that the selected node is N_0 with a set of first-level connections {N_1, N_2, . . . N_q}. The set of first-level connections is identified by starting at N_0 and traversing the causality graph to identify a node that is directly linked with N_0. Once a node is identified as being directly linked with NO, the server adds the node to the set of first-level connections corresponding to N_0. The server ranks the nodes in the set of first-level connections according to temporal lags of the nodes. Thus, the set of first-level connections {N_1, N_2, . . . N_q} includes nodes that are ordered according to the temporal lags. In an example, the ordering may be in an increasing manner, thus N_1 has least temporal lag in the ordered set. In another example, the ordering may be in decreasing manner, in which case N_q has the least temporal lag. The server filters the set of first-level connections {N_1, N_2, . . . N_q} by removing nodes in the set that have a direct connection with the node with the least temporal lag. For example, for all the nodes N_i, where i is from 2 to q, the server deletes N_i from the ordered set {N_1, N_2, . . . N_q}, if there is a connection between N_1 and N_(i-1). The server further recursively repeats the process for all the nodes in the set of first-level connections {N_1, N_2, . . . N_q}. The server ensures that all the nodes in the causality graph are analyzed in this manner. The resulting first-level connection sets for each respective node in the causality graph is the temporal connectivity of the pipeline network according to pairwise causality among the stations in the pipeline network.

The server determines relative distances between the stations of the pipeline network based on the topological network. For example, the relative distances may be the temporal lags of the nodes in the topological network. In an example, the relative distance of a node may be a scaled value based on the temporal lag of that node and a predetermined scaling value. The server further communicates the topological network and/or the relative distances for display.

Figure 3:
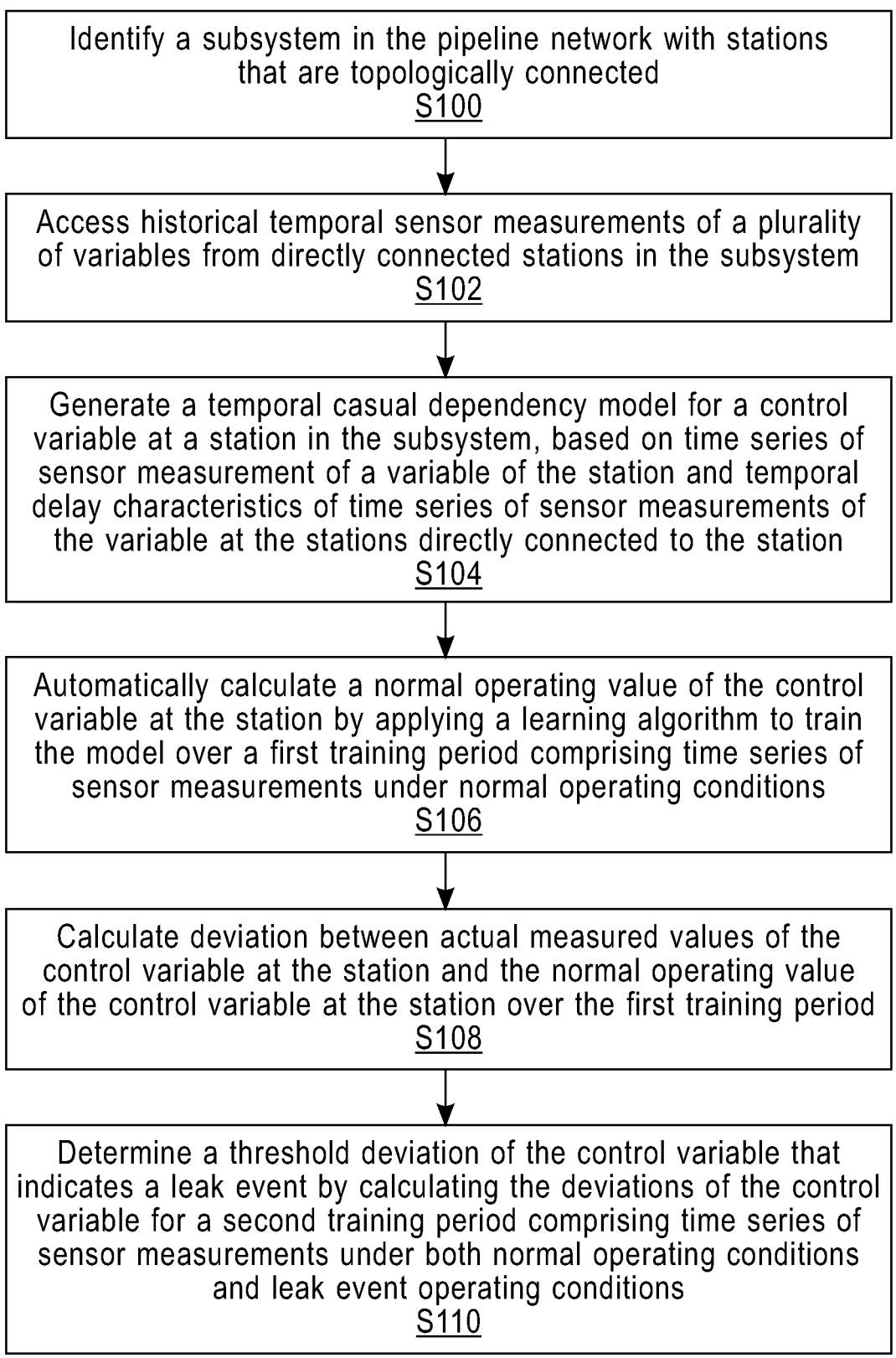
FIG. 3 is a flow chart of the steps of one embodiment of the method of the invention.

As is shown in FIG. 3, one embodiment of the method of the invention begins with step S100 of identifying a subsystem in the pipeline network, which comprises a plurality of stations that are topologically connected. At step S102, the system accesses historical temporal sensor measurements of a plurality of variables from the stations in the subsystem that are directly connected. Directly connected stations are illustrated in FIG. 1 as stations connected directly by pipelines, without any other stations in between. The identification of stations directly connected to each station is obtained from the topological connectivity obtain, for example, from the method described above. The historical temporal sensor measurements include a plurality of time series of sensor measurements captured at corresponding timestamps over a predetermined time-span.

At step S104, the system generates a temporal causal dependency model for a first control variable at the first station in the subsystem, based on the plurality of time series of sensor measurements of a second variable of the first station, and temporal delay characteristics of the plurality of time series of sensor measurements of the second variable at the stations directly connected to the first station. The plurality of time series of sensor measurements is accessed from historical temporal sensor measurements in step S102. The first control variable is a different variable from the second variable. The temporal casual dependency model is generated for a control variable based on values of one or more variables other than the control variable. The model is generated for one of the stations in the subsystem and each station in the subsystem has a model for that station. One example of the temporal causal dependency model is illustrated in table 3:

TABLE 3

In a high pressure gas pipeline system, there are n stations. For station i = 1, . . . , n, we have $p_i$ time series, and $q_i$ is the number of
time series measurements from immediately connected stations:
$$y_i(t) \sim \mathcal{F}(x_{i,1}(t), \ldots, x_{i,P_i}(t), x_{i1}^{t,Lagged}, \ldots, x_{i,qi}^{t,Lagged})$$
where:
$y_i(t)$ is the control variable for station i, e.g., pressure measurementat station i;
$x_{i,j}(t)$ is thecurrent value of the $j^{th}$ time series for station i, eg., flow measurement at station i;
$x_{i,k}^{t,Lagged} = [x_{k,1}(t - L), \ldots, x_{k,1}(t - 1), \ldots, x_{k,qi}(t - L), \ldots, x_{k,qi}(t - 1)]$
denotes
the $k_{th}$ lagged values of the time series available at immediately connected stations.

Further at step S106, the system automatically calculates a normal operating value of the first control variable at the first station by applying a learning algorithm to train the temporal causal dependency model over a first training period comprising one or more time series of sensor measurements made under normal operating conditions. One example of the learning algorithm is a Lasso Linear Regression. The time series of sensor measurement made under normal operating conditions are accessed from historical temporal sensor measurements in step S102. The training period is a predetermined time-span.

At step S108, the system calculates deviations between actual measured values of the first control variable at the first station and the normal operating value of the first control variable at the first station over the first training period. The actual measured values of the first control variable at the first station are generated from the temporal causal dependency model of the first station from S104. Each actual measured value is based on a different timestamp over a predetermined time-span, upon which the sensor measurements of each time series are captured.

At step S110, the system determines a threshold deviation of the first control variable that indicates a leak event by calculating the deviations of the first control variable for a second training period comprising a plurality of time series of sensor measurements made under both normal operating conditions and leak event operating conditions. An example of determining a threshold deviation of the first control variable is to plot the deviations of the first control variable over a second training period and fit a Gaussian distribution. The second training period is a predetermined time-span. The plurality of time series of sensor measurements made under both normal operating conditions and leak event operating conditions are from historical temporal sensor measurements accessed in step S102.

In one embodiment, the plurality of time series of sensor measurements of a second variable of the plurality of variables at the first station are current values of the sensor measurements. In another embodiment, the temporal delay characteristics of the plurality of time series of sensor measurements of the second variable at the stations directly connected to the first station are lagged values of the sensor measurements. The current characteristic of current values and the lagged characteristic of lagged values are comparative to each other in a time-span.

In an embodiment, the system further applies the learning algorithm to the temporal causal dependency model to compute a risk score of the first control variable. The risk score is based on differences between the calculated deviations and the threshold deviation.

In one embodiment, the learning algorithm is a Lasso model. On example of the Lasso Model is illustrated in Table 4. $\epsilon$ is an allowable error, T is the ending time of the time series data collected, and L is the max lagged value.

TABLE 4

$$y_i(t) = \beta_i X_i(t) + \epsilon, \; \beta_i = \underset{\beta}{\mathrm{argmin}} \sum_{t=L+1}^{T} |y_i(t) - \beta X_i(t)|^2 + \lambda \|\beta\|_1$$

where:
$\beta_i = [\beta_{i,1}, \ldots, \beta_{i,P_i}, \beta_{i,1}^{Lagged}, \ldots, \beta_{i,q_i}^{Lagged}]$ is how the row vector of all the coefficients for
station i, where $\beta_{i,k}^{Lagged}$ denotes all the coefficients for the lagged variables at station k, TABLE 4-continued which is connected to station i;
$X_i(t) = [x_{i,1}(t), \ldots, x_{i,p_i}(t), x_{i,1}^{tLagged}, \ldots, x_{i,q_i}^{tLagged}]$ is the column vector of all the values of
the variables for station i at time t.
$\lambda$ is a tuning parameter (can be set e.g. by cross-validation).
The $\ell_1$ penalty tends to "push" coefficients to zero. This leads to a sparse structure that
indicates the most important temporal dependencies between the time series.

In another embodiment, the system further applies the learning algorithm for ranking the time series of sensor measurements of the plurality of variables for generating the temporal causal dependency model for the first control variable. A Lasso Model provides one example of ranking the time series of sensor measurement of the plurality of variables. Table 5 illustrates the ranking feature embodied in the Lasso coefficients. L is the max lagged value.

TABLE 5 importance of time series $x_q = \dfrac{\max_{\ell \leq L} \beta_{q,\ell}}{\max_q (\max_{\ell \leq L} \beta_{q,\ell})}$ $\beta_{q,\ell}$ is the LASSO coefficient for measurement q for the lag $\ell$ In one embodiment, the historical temporal sensor measurements of the plurality of control variables are accessed from a data repository of a SCADA system monitoring the fluid-delivery pipeline network. One example of accessing the historical temporal sensor measurements is using data acquisition (SCADA) system. The SCADA system may visualize the physical delivery system as a network of stations and the directly connected pipelines, wherein the visualization is based on the operator manually identifying the connections between the stations. The SCADA system may be connected to one or more measurement sensors that measure attributes of the fluid transportation in the delivery system. For example, the sensors may measure flow-rate, pressure, volume, or any other attribute of the flow of the fluid through the delivery system. The sensors may be located at one or more stations. Alternatively or in addition, the sensors may be located on the pipeline network, between the stations. Throughout the present disclosures, the examples consider that the sensors are located at the stations in the delivery stations. However, it will be obvious to a person skilled in the art that the technical solutions are applicable to the sensors irrespective of where the sensors are located in the delivery system.

In another embodiment, the system further processes the accessed historical temporal sensor measurements of the plurality of control variables by removing outliers, removing short spikes and smoothing.

In one embodiment, the system further generates the temporal causal dependency model for the first control variable of the plurality of control variables at the first station in the subsystem, based on the plurality of time series of sensor measurements of a plurality of variables at the first station, and temporal delay characteristics of the plurality of time series of sensor measurements of the plurality of variables at the stations directly connected to the first station.

What is claimed is:

1. A computer implemented method for forecasting leaks in a fluid-delivery pipeline network, the method comprising:
   identifying a subsystem of the pipeline network, the subsystem comprising a plurality of stations that are topologically connected;
   computing temporal delay characteristics using different temporal series of measurement data from each of the stations of the subsystem, the computing temporal delay characteristics including computing a plurality of temporal lags and corresponding lag coefficients associated with each of the plurality of temporal lags and identifying a temporal lag of the plurality of temporal lags that has a maximum corresponding lag coefficient;
   identifying temporal connectivity of stations of the subsystem based on the identified temporal lag;
   generating a causality graph based on the identified temporal connectivity of stations of the subsystem and a determination of causality between temporal sensor measurements of different stations that are directly connected to each other, the causality graph being generated using different temporal series of sensor measurements from each of the stations of the subsystem, the causality graph indicating causal relationship between at least an upstream station of the subsystem and a downstream station of the subsystem that is directly connected to the upstream station; and
   for each particular station of the stations in the subsystem:
      generating a temporal causal dependency model for a first control variable of a plurality of variables at the particular station in the subsystem based on the different temporal series of measurement data of a second variable of the plurality of variables at the particular station, and the temporal delay characteristics of the different temporal series of measurement data of the second variable at the stations directly connected to the particular station, the first control variable being a pressure of fluid at the particular station in the subsystem, the second variable being a flow measurement of fluid at one or more stations directly connected to the particular station in the subsystem;
      automatically calculating a normal operating value of the first control variable at the particular station by applying a learning algorithm to train the temporal causal dependency model associated with the particular station over a first training period comprising one or more different temporal series of measurement data made under normal operating conditions without any leak event operating conditions;
      automatically calculating deviations between current measured values of the first control variable at the particular station and the normal operating value of the first control variable at the particular station over the first training period;
      determining a threshold deviation of the first control variable that indicates a leak event by calculating deviations of the first control variable for a second training period comprising a different temporal series of measurement data made under both normal operating conditions and leak event operating conditions; and providing an alert to trigger a correction of the leak event to prevent damage to the pipeline network.

2. The computer implemented method of claim 1, wherein the different temporal series of measurement data of a second variable of the plurality of variables at the particular station are current values of the sensor measurements.

3. The computer implemented method of claim 1, wherein the temporal delay characteristics of the different temporal series of measurement data of the second variable at the stations directly connected to the particular station are lagged values of the sensor measurements.

4. The computer implemented method of claim 1, further comprising applying the learning algorithm to the temporal causal dependency model to compute a risk score of the first control variable, the risk score being based on differences between the calculated deviations and the threshold deviation.

5. The computer implemented method of claim 1, further comprising applying the learning algorithm for ranking the temporal series of measurement data of the plurality of variables for generating the temporal causal dependency model for the first control variable.

6. The computer implemented method of claim 1, wherein the temporal sensor measurements of the plurality of control variables are accessed from a data repository of a supervisory control and data acquisition (SCADA) system monitoring the fluid-delivery pipeline network.

7. The computer implemented method of claim 1, further comprising processing the temporal sensor measurements of the plurality of control variables by removing outliers, removing short spikes and smoothing.

8. The computer implemented method of claim 1, wherein the learning algorithm is a Lasso model.

9. The computer implemented method of claim 1, further comprising generating the temporal causal dependency model for the first control variable of the plurality of control variables at the particular station in the subsystem, based on the different temporal series of measurement data of a plurality of variables at the particular station, and temporal delay characteristics of the different temporal series of measurement data of the plurality of variables at the stations directly connected to the particular station.

10. A computer system for forecasting leaks in a fluid-delivery pipeline network, comprising:
a memory; and
a hardware processor configured to:
identify a subsystem of the pipeline network, the subsystem comprising a plurality of stations that are topologically connected;
computing temporal delay characteristics using different temporal series of measurement data from each of the stations of the subsystem, the computing temporal delay characteristics including computing a plurality of temporal lags and corresponding lag coefficients associated with each of the plurality of temporal lags and identifying a temporal lag of the plurality of temporal lags that has a maximum corresponding lag coefficient;
identifying temporal connectivity of stations of the subsystem based on the identified temporal lag;
generate a causality graph based on the identified temporal connectivity of stations of the subsystem and a determination of causality between temporal sensor measurements of different stations that are directly connected to each other, the causality graph being generated using different temporal series of sensor measurements from each of the stations of the subsystem, the causality graph indicating causal relationship between at least an upstream station of the subsystem and a downstream station of the subsystem that is directly connected to the upstream station; and
for each particular station of the stations in the subsystem of the pipeline topology:
generate a temporal causal dependency model for a first control variable of a plurality of variables at the particular station in the subsystem based on the different temporal series of measurement data of a second variable of the plurality of variables at the particular station, and temporal delay characteristics of the different temporal series of measurement data of the second variable at the stations directly connected to the particular station, the first control variable being a pressure of fluid at the particular station in the subsystem, the second variable being a flow measurement of fluid at one or more stations directly connected to the particular station in the subsystem;
automatically calculate a normal operating value of the first control variable at the particular station by applying a learning algorithm to train the temporal causal dependency model associated with the particular station over a first training period comprising one or more different temporal series of measurement data made under normal operating conditions without any leak event operating conditions;
automatically calculate deviations between current measured values of the first control variable at the particular station and the normal operating value of the first control variable at the particular station over the first training period;
determine a threshold deviation of the first control variable that indicates a leak event by calculating deviations of the first control variable for a second training period comprising a different temporal series of measurement data made under both normal operating conditions and leak event operating conditions; and
provide an alert to trigger a correction of the leak event to prevent damage to the pipeline network.

11. The computer system of claim 10, wherein the different temporal series of measurement data of a second variable of the plurality of variables at the particular station are current values of the sensor measurements, and the temporal delay characteristics of the different temporal series of measurement data of the second variable at the stations directly connected to the particular station are lagged values of the sensor measurements.

12. The computer system of claim 10, wherein the processor is further configured to apply the learning algorithm to the temporal causal dependency model to compute a risk score of the first control variable, the risk score being based on differences between the calculated deviations and the threshold deviation, and the learning algorithm is a Lasso model.

13. The computer system of claim 10, wherein the temporal sensor measurements of the plurality of control variables are accessed from a data repository of a supervisory control and data acquisition (SCADA) system monitoring the fluid-delivery pipeline network.

14. The computer system of claim 10, wherein the processor is further configured to process the temporal sensor measurements of the plurality of control variables by removing outliers, removing short spikes and smoothing.

15. The computer system of claim 10, wherein for each of the subset of the plurality of stations of the pipeline topology, the processor is further configured to generate the temporal causal dependency model for the first control variable of the plurality of control variables at the particular station in the subsystem, based on the different temporal series of measurement data of a plurality of variables at the particular station, and temporal delay characteristics of the different temporal series of measurement data of the plurality of variables at the stations directly connected to the particular station.

16. A non-transitory article of manufacture tangibly embodying computer readable instructions, which when implemented, cause a computer to perform the steps of a method for forecasting leaks in a fluid-delivery pipeline network, comprising:
  identifying a subsystem of the pipeline network, the subsystem comprising a plurality of stations that are topologically connected;
  computing temporal delay characteristics using different temporal series of measurement data from each of the stations of the subsystem, the computing temporal delay characteristics including computing a plurality of temporal lags and corresponding lag coefficients associated with each of the plurality of temporal lags and identifying a temporal lag of the plurality of temporal lags that has a maximum corresponding lag coefficient;
  identifying temporal connectivity of stations of the subsystem based on the identified temporal lag;
  generating a causality graph based on the identified temporal connectivity of stations of the subsystem and a determination of causality between temporal sensor measurements of different stations that are directly connected to each other, the causality graph being generated using different temporal series of sensor measurements from each of the stations of the subsystem, the causality graph indicating causal relationship between at least an upstream station of the subsystem and a downstream station of the subsystem that is directly connected to the upstream station; and
  for each particular station of the stations in the subsystem:
    generating a temporal causal dependency model for a first control variable of a plurality of variables at the particular station in the subsystem, based on the different temporal series of measurement data of a second variable of the plurality of variables at the particular station, and temporal delay characteristics of the different temporal series of measurement data of the second variable at the stations directly connected to the particular station, the first control variable being a pressure of fluid at the particular station in the subsystem, the second variable being a flow measurement of fluid at one or more stations directly connected to the particular station in the subsystem;
    automatically calculating a normal operating value of the first control variable at the particular station by applying a learning algorithm to train the temporal causal dependency model over a first training period comprising one or more different temporal series of measurement data made under normal operating conditions without any leak event operating conditions;
    automatically calculating deviations between current measured values of the first control variable at the particular station and the normal operating value of the first control variable at the particular station over the first training period;
    determining a threshold deviation of the first control variable that indicates a leak event by calculating deviations of the first control variable for a second training period comprising a different temporal series of measurement data made under both normal operating conditions and leak event operating conditions; and
    providing an alert to trigger a correction of the leak event to prevent damage to the pipeline network.

17. The non-transitory article of manufacture of claim 16, wherein the different temporal series of measurement data of a second variable of the plurality of variables at the particular station are current values of the sensor measurements, and the temporal delay characteristics of the different temporal series of measurement data of the second variable at the stations directly connected to the particular station are lagged values of the sensor measurements.

18. The non-transitory article of manufacture of claim 16, further comprising applying the learning algorithm to the temporal causal dependency model to compute a risk score of the first control variable, the risk score being based on differences between the calculated deviations and the threshold deviation, and the learning algorithm is a Lasso model.

19. The non-transitory article of manufacture of claim 16, wherein the temporal sensor measurements of the plurality of control variables are accessed from a data repository of a supervisory control and data acquisition (SCADA) system monitoring the fluid-delivery pipeline network, and further comprising processing the temporal sensor measurements of the plurality of control variables by removing outliers, removing short spikes and smoothing.

20. The non-transitory article of manufacture of claim 16, further comprising generating the temporal causal dependency model for the first control variable of the plurality of control variables at the particular station in the subsystem, based on the different temporal series of measurement data of a plurality of variables at the particular station, and temporal delay characteristics of the different temporal series of measurement data of the plurality of variables at the stations directly connected to the particular station.

* * * * *